United States Patent [19]

Matsufuji

[11] Patent Number: 5,644,954
[45] Date of Patent: Jul. 8, 1997

[54] TRANSMISSION ASSEMBLY FOR TRACTORS

[75] Inventor: Mizuya Matsufuji, Sanda, Japan

[73] Assignee: Kanzaki Kokyukoki Mfg. Co., Ltd., Amagasaki, Japan

[21] Appl. No.: 541,480

[22] Filed: Oct. 10, 1995

[30] Foreign Application Priority Data

Nov. 11, 1994 [JP] Japan .................................. 6-302794

[51] Int. Cl.$^6$ ........................................................ B60K 17/06
[52] U.S. Cl. ........................................................ 74/606 R
[58] Field of Search ............................. 74/606 R; 60/325; 475/72, 73

[56] References Cited

U.S. PATENT DOCUMENTS

| | | | |
|---|---|---|---|
| 3,800,913 | 4/1974 | Schmitt | 74/606 R X |
| 3,913,415 | 10/1975 | Herr | 74/606 R X |
| 4,226,200 | 10/1980 | Morisawa et al. | 74/606 R |
| 4,364,285 | 12/1982 | Morisawa et al. | 74/606 R |
| 5,152,190 | 10/1992 | Jurgen et al. | 74/606 R |
| 5,176,039 | 1/1993 | Takeuchi et al. | 74/606 R |
| 5,195,400 | 3/1993 | Hayakawa et al. | 74/606 R |
| 5,477,751 | 12/1995 | Akiyama | 74/606 R |
| 5,483,850 | 1/1996 | Yamauchi | 74/606 R |

*Primary Examiner*—Charles A. Marmor
*Assistant Examiner*—Saul J. Rodriguez

[57] ABSTRACT

Within a rear half of a tractor front housing (1) which includes an internal partition wall (1a) and an open rear end, a fluid-operated first speed cleanse mechanism (12) is disposed and is supported, at its rear side, by a bearing support frame (4) which is in turn supported by the front housing. Within a transmission casing (2) which includes an open front end and is fastened to the rear of the front housing, a second speed change mechanism (15) is disposed and is supported, at its front side, by the support frame. A fluid pump (72) for supplying fluid to the first change mechanism is mounted on the partition wall. The support frame includes therein a fluid passage (162) which is adapted to function as a fluid passage for supplying fluid from a fluid sump within the vehicle body to the pump. The passage has first and second open ends (162a, 162b) at front and rear surfaces of the frame for connecting the passage to a pump suction passage (160) and to a fluid sump filter (165), preferably through internal pipes (166, 167).

5 Claims, 5 Drawing Sheets

TRANSMISSION ASSEMBLY FOR TRACTORS

FIELD OF THE INVENTION

This invention relates a transmission assembly for tractors. More particularly, the present invention relates to a transmission assembly for tractors comprising a front housing which includes an internal partition wall and an open rear end and in which a fluid-operated first speed change mechanism is disposed at a location behind the partition wall, a transmission casing which includes an open front end and is fastened to the rear of the front housing and in which a second speed change mechanism is disposed, and a bearing support frame which is fixedly disposed within a rear end portion of the front housing for supporting the first change mechanism at a rear side of this change mechanism and for supporting the second change mechanism at a front side of this change mechanism.

BACKGROUND OF THE INVENTION

A transmission assembly of the structure set forth above is known from U.S. Pat. No. 5,058,455. In the transmission assembly shown in this U.S. patent, the bearing support frame is supported by the transmission casing by being secured to internal bosses which are projected inwardly from a front end portion of the transmission casing.

In an embodiment shown in the above-referenced U.S. patent, a fluid pump for supplying fluid to the fluid-operated first change mechanism is mounted on a front surface of the partition wall and is adapted to be driven by an input shaft of the fluid-operated change mechanism. No fluid supply passage means is provided within the vehicle body for supplying fluid from a fluid sump within the vehicle body to the fluid pump. It is thus considered that a fluid supply piping is arranged at an outside of the vehicle body. Such outside piping may often be an obstruction and will require a tight sealing for preventing oil leak perfectly. Accordingly, if fluid supply passage means could be arranged within the vehicle body successfully without any problem, that would be very advantageous.

Further, because a fluid-operated speed change mechanism comprises plural fluid-operated clutches having relatively large size and large weight, it is desirable to assemble this mechanism into a rear hall of the front housing fully in advance and then to install the front housing onto the front of the transmission casing. However, the bearing support frame set forth above does not allow such a previous full assembly with respect to the front housing because this support frame is designed as a member to be supported by the transmission casing.

An object of the present invention is to provide an improved transmission assembly for tractors in which fluid supply passage means for a fluid pump is fully arranged within a tractor vehicle body without causing any problem.

Another object of the present invention is to provide an improved transmission assembly for tractors in which a fluid-operated speed change mechanism is provided so as to assemble it into a rear half of a front housing in advance in a fully assembled condition while facilitating the arrangement of fluid supply passage means for a fluid pump within a tractor vehicle body.

SUMMARY OF THE INVENTION

The present invention relates to a transmission assembly for tractors comprises: a front housing (1) including an internal partition wall (1a) and an open rear end; a transmission casing (2) including an open front end and being fastened to the rear end of the front housing; a fluid-operated first speed change mechanism (12) disposed within the front housing at a location behind the partition wall; a second speed change mechanism (15) disposed within the transmission casing; and a bearing support frame (4) fixedly disposed within a rear end portion of the front housing for supporting the first speed change mechanism at a rear side of this change mechanism and for supporting the second speed change mechanism at a front side of this change mechanism.

According to the present invention, a fluid pump (72) for supplying fluid to the first speed change mechanism (12) is mounted on the partition wall (1a). A fluid passage (162) is provided within the bearing support frame (4) such that this passage has a first open end (162a) at a front surface of the support frame and a second open end (162b) at a rear surface of said support frame. A first fluid supply passage means (166; 266) is disposed within the front housing (1) for connecting between a fluid suction passage (160) of the fluid pump (72) and the first open end (162a) of the fluid passage (162) within the support frame (4). Further, a second fluid supply passage means (167; 267) is disposed within the transmission casing (2) for connecting between a fluid sump filter (165) and the second open end (162b) of the fluid passage (162) within the support frame (4).

In this structure, the bearing support frame (4) having therein a fluid passage (162) functions as a fluid passage-connecting member between the fluid sump filter (165) and the fluid pump (72). The first open end (162a) of the fluid passage (162) can be located such that the first fluid supply passage means (166; 266) does not interfere with other members within the front housing (1), while the second open end (162b) of the fluid passage (162) can be located such that the second fluid supply passage means (167; 267) does not interfere with other members within the transmission casing (2).

In a preferred embodiment of the present invention, the bearing support frame (4) is supported by the front housing (1). The fluid suction passage (160) is arranged such that it opens at a rear surface of the partition wall (1a). Further, the first and second fluid supply passage means are composed, respectively, of pipe members (166, 167).

According to this structure in which the bearing support frame (4) disposed within a rear end portion of the front housing is not supported by the transmission casing (2) but by the front housing (1), the fluid-operated first speed change mechanism (12) can be assembled into a rear hall of the front housing in advance in a fully assembled condition using the internal partition wall (1a) as a support for supporting this change mechanism at a front side of it and using the bearing support frame (4) as a support for supporting the change mechanism (12) at a rear side of it. Then, the front housing (1) can be installed onto the front of the transmission casing (2) such that the second speed change mechanism (15) is supported at its front side by the bearing support frame (4).

The first fluid supply passage means composed of a pipe member (166) can be installed into the front housing (1), at the same time when the first change mechanism (12) is assembled into the front housing, such that the pipe member (166) is fitted at its front end in the open end of the fluid suction passage (160) and at its rear end in the first open end (162a) of the fluid passage (162) within the support frame (4). The second fluid supply passage means composed of a pipe member (167) can be installed into the transmission casing (2) such that the pipe member (167) is arranged in advance within the transmission casing and such that, widen the front housing (1) is installed onto the front of the transmission casing, the pipe member (167) is fitted at its front end in the second open end (162b) of the fluid passage (162) within the support frame (4) so as to be fixed in position.

The fluid passage (162) within the bearing support frame (4) constitutes a part of the fluid supply line for the fluid pump (72). This fluid passage (162) can be formed within the support frame in an arrangement such that its first open end (162a) is not faced to any members of the fluid-operated first speed change mechanism (12) within the front housing (1) and such that the second open end (162b) is not faced to any members of the second speed change mechanism (15) within the transmission casing (2). Consequently, by arranging the open end of the fluid suction passage (160) in the partition wall (1a) in correspondence to the position of the first open end (162a) of passage (162), the first pipe member (166) can be arranged within the front housing such that it well avoids interference with other members. Also, by arranging the second pipe member (167) in correspondence to the position of the second open end (162b) of passage (162), this pipe member can be arranged within the transmission casing without any interference with other members.

Preferably, the fluid passage (162) within the support frame (4) extends generally in a vertical direction and has the first open end (162a) at its upper end and the second open end (162b) at its lower end. The first open end (162a) of a high level permits the first fluid supply pipe member (166) to be arranged in a space above the first speed change mechanism (12) within the front housing (1), and the second open end (162b) of a low level permits the employment of a generally straight pipe as the second pipe member (167) for connecting the second open end to the filter (165) within a fluid sump of a low level.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
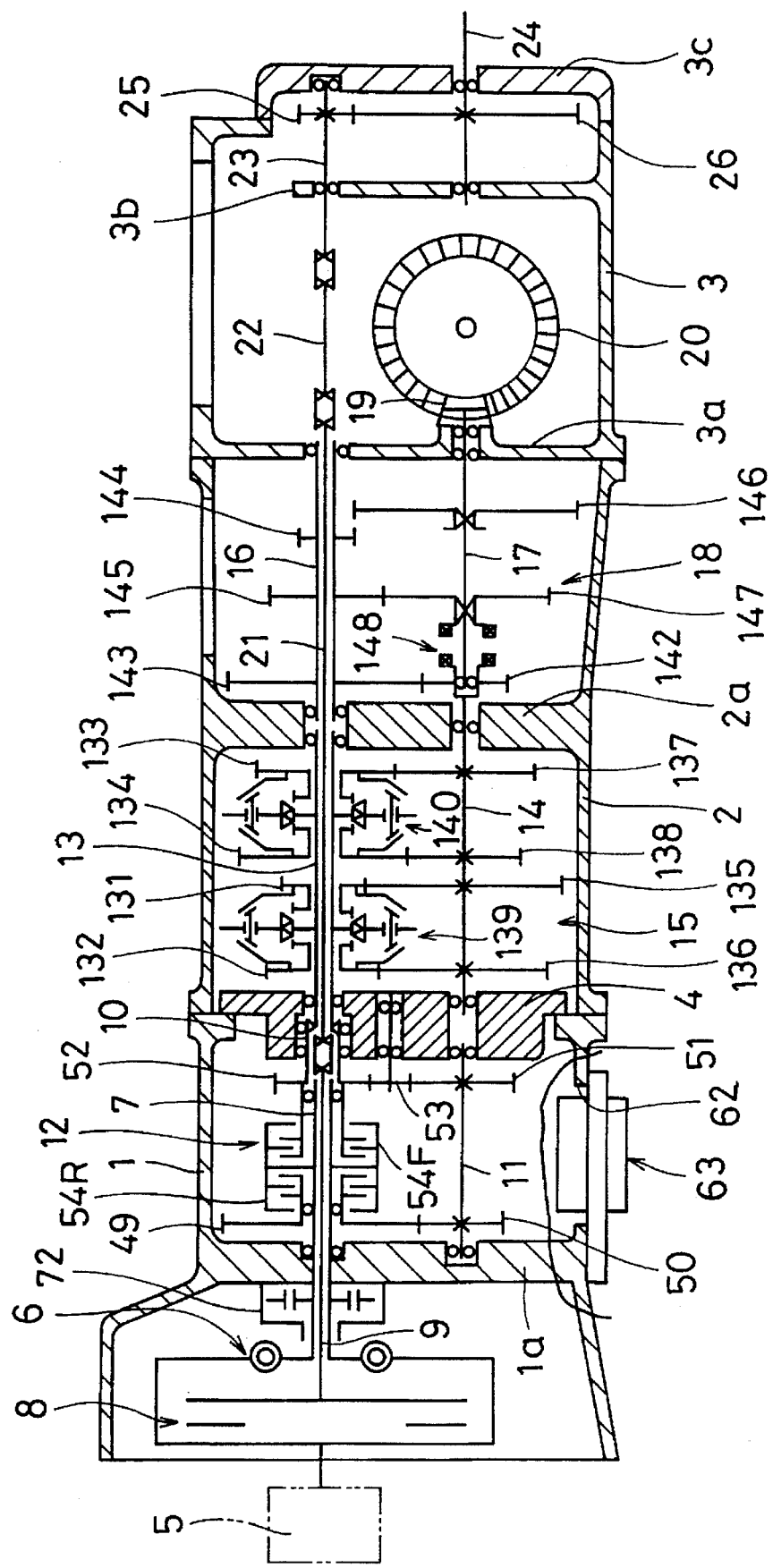
FIG. 1 is a schematic sectional side view, partially developed, showing the whole of transmission system in a tractor in which a preferred embodiment of the transmission assembly according to the present invention is employed.

FIG. 1 shows schematically the whole of the transmission system of a tractor in which a preferred embodiment of the present invention is employed. The vehicle body of the tractor shown is composed of a front housing 1, transmission casing 2 and rear housing 3 which are arranged in series in a longitudinal direction of the tractor and are fastened together. Front housing 1 includes an open front end, an open rear end and an internal partition wall 1a. A bearing support frame 4 which is fixedly secured to the front housing 1 is disposed within a rear end portion of this housing 1. Transmission casing 2 includes an open front end, an open rear end and an internal support wall 2a. Rear housing 3 includes a front wall 3a, an internal support wall 3b which upstands from the inner bottom of this housing 3, and an open rear end which is closed by a rear end cover 3c.

As also shown in FIG. 1, engine 5 is arranged at a frontmost end of the vehicle body. Within the front housing 1, there are disposed a hollow primary shaft 7 of the vehicle drive-power transmission line, which is driven to rotate by engine 5 through a cushion spring mechanism 6, and a primary shaft 9 of the power take-off transmission line which is driven to rotate by engine 5 through a power take-oil clutch 8. The primary shaft 7 of the vehicle drive-power transmission line extends axially of the vehicle through the partition wall 1a, and the primary shaft 9 of the power take-off transmission line extends through the hollow primary shaft 7. There are disposed also within the front housing 1 a hollow output shaft 10, which is located behind and co-axially with the primary shaft 7 and is supported by the bearing support frame 4, and an intermediate shaft 11 which is located below the shafts 7 and 10 and is supported by the partition wall 1a and by the bearing support frame 4. An additional speed change mechanism 12 is disposed within the front housing 1 and behind the partition wall 1a such that it performs a speed change transmission between the primary shaft 7 and the output shaft 10.

A hollow drive shaft 13 of a high level and a speed change shaft 14 of a low level are disposed within the transmission casing 2 and are supported by the bearing support frame 4 and by the support wall 2a, respectively. The drive shaft 13 is coupled to the output shaft 10 at a location within the support frame 4. Within a front half of the transmission casing 2, a primary speed change mechanism 15 is disposed and is operable to perform a speed change transmission between the drive shaft 13 and the change shaft 14.

Within a rear half of the transmission casing 2, there are disposed a hollow intermediate shaft 16 which is located behind and co-axially with the drive shaft 13, a propeller shaft 17 which is located behind and co-axially with the change shaft 14, and an auxiliary speed change mechanism 18 which is operable to perform a speed change transmission between the change shaft 14 and the propeller shaft 17. Propeller shaft 17 extends into the rear housing 3 and has, at its rear end, a small bevel gear 19 which is meshed with a larger input bevel gear 20 of a differential gearing lot left and right rear wheels (both not shown) so that the vehicle is driven to travel by the drive of the left and right rear wheels.

The primary shaft 9 of the power take-off line is connected to a transmission shaft 21 which extends through the hollow drive shaft 13 and intermediate shaft 16, and then to two transmission shafts 22 and 23 which are disposed in series within the rear housing 3. A PTO shaft 24 which is driven to rotate by transmission shaft 23 through speed-reduction meshing gears 25 and 26 is supported by the support wall 3b and by the rear end cover 3c and extends rearwardly from the vehicle body.

Figure 2:
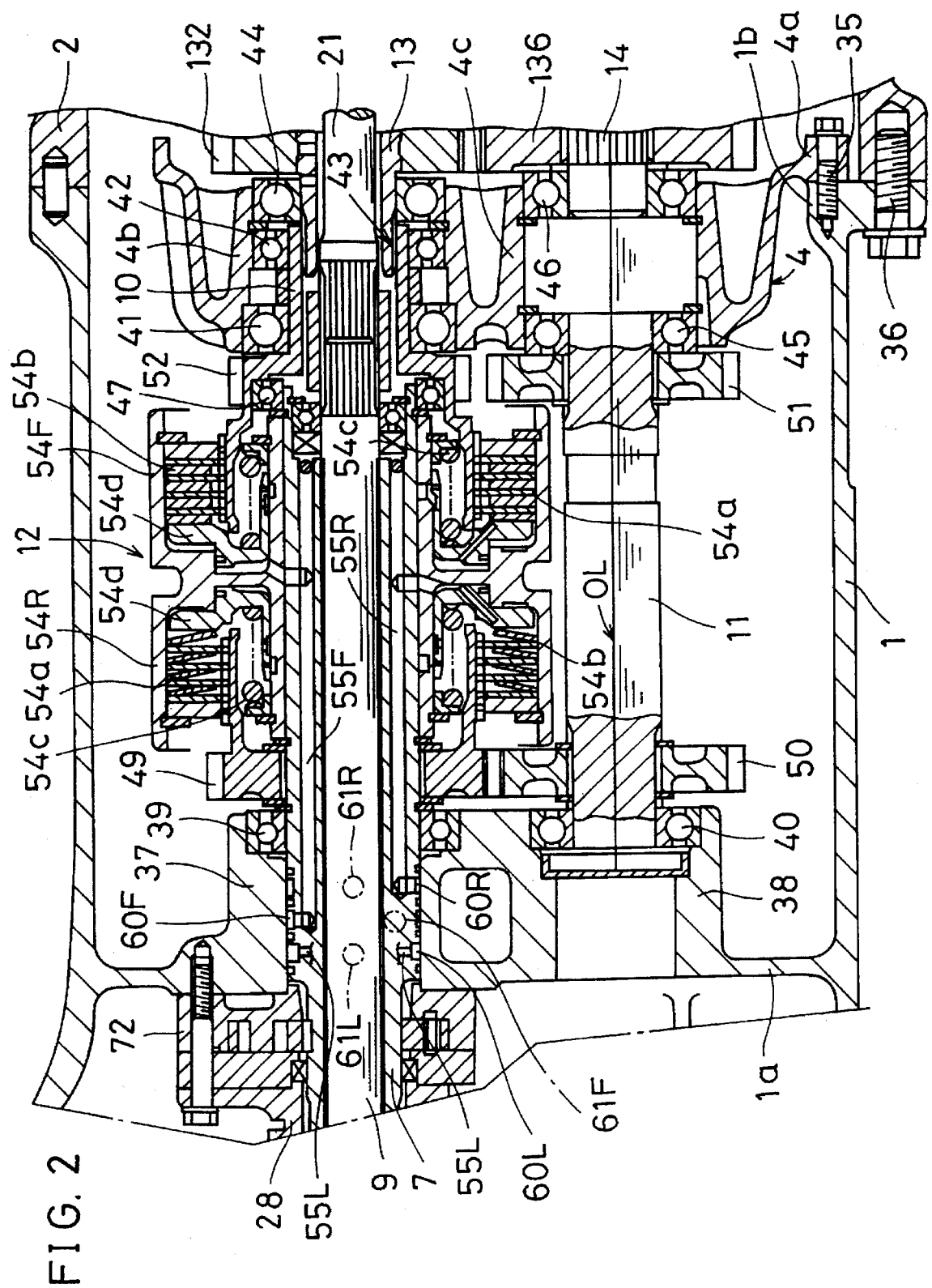
FIG. 2 is a sectional side view showing a rear half of a front housing shown in FIG. 1.
Figure 3:
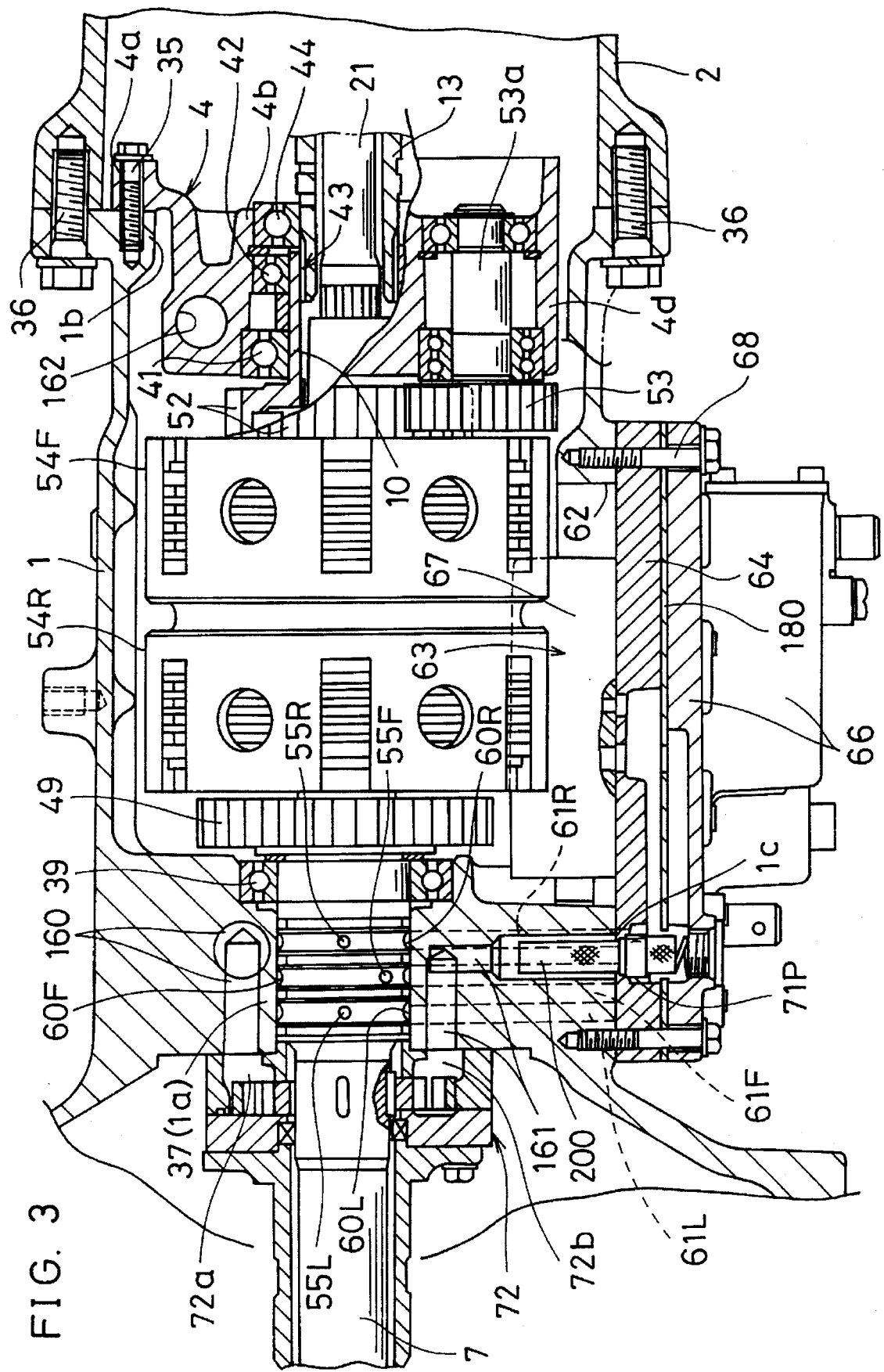
FIG. 3 is a sectional plane view showing the rear half of the front housing.

The additional speed change mechanism 12 will be detailed by referring to FIGS. 2 and 3. The bearing support frame 4 is shaped such that this frame has, at its rearmost outer periphery, plural projections 4a which are adapted to abut from the side of transmission casing 2 against bosses 1b which are projected inwardly from the inner surface of a rear end portion of the front housing 1. Bolts 35 extend through projections 4a and are threadingly engaged with bosses 1b so as to secure the support frame 4 to the rear of the housing 1. The front housing 1 and transmission casing 2 are fastened together at their outer flanged portions using bolts 36 which are threadingly engaged with the casing 2 from the side of front housing 1.

As also shown in FIGS. 2 and 3, the primary shaft 7 is shaped such that it includes an outer diameter-enlarged rear half having its front end at an axial location nearly equal to that of the front surface of the partition wall 1a. A thickened hollow cylindrical portion 37 for receiving a front end portion of the diameter-enlarged rear half of the primary shaft 7 is formed integrally in the partition wall 1a, and another thickened hollow cylindrical portion 38 which is integrally connected with the former cylindrical portion 37 is also formed in the partion wall 1a such that this portion 38 is faced to the intermediate shaft 11. The bearing support frame 4 is further shaped such that it includes upper and lower cylindrical support portions 4b and 4c and another hollow cylindrical support portion 4d of a mid level. An axially mid portion of the primary shaft 7 and a front end portion of the intermediate shaft 11 are supported respectively by the partition wall 1a through ball bearings 39 and 40 which are located respectively at rear end portions of the cylindrical portions 37 and 38. Output shaft 10 is supported by the upper cylindrical support portion 4b of support frame 4 through a pair of ball bearings 41 and 42. A front end portion of the drive shaft 13 which is coupled to the output shaft 10 by a spline connection 43 is also supported by the cylindrical support portion 4b through a ball bearing 44. A rear end portion of the intermediate shaft 11 and a front end portion of the change shaft 14 are supported respectively by the lower cylindrical support portion 4c of the support frame 4 through a ball bearing 45 and through a ball bearing 46. A rear end portion of the primary shaft 7 is supported by the output shaft 10 through a ball bearing 47 so that this end portion of shaft 7 is supported by the frame 4 through output shaft 10.

The additional speed change mechanism 12 includes a first gear 49 which is rotatably mounted on the primary shaft 7, a second gear 50 which is fixedly mounted on the intermediate shaft 11 and is meshed with the first gear 49, a third gear 51 which is fixedly mounted on the intermediate shaft 11, a fourth gear 52 which is formed integrally with the output shaft 10 at its foremost end, and an idler gear 53 which is supported at its integral shaft portion 53a by the cylindrical support portion 4d through ball bearings and is meshed with both of the third and fourth gears 51 and 52.

On the primary shaft 7, there are mounted a fluid-operated clutch 54R for coupling the first gear 49 selectively to the primary shaft 7 and another fluid-operated clutch 54F for coupling the fourth gear 52 selectively to the primary shaft. A clutch cylinder common to these clutches 54F and 54R is employed and is fixedly mounted on the primary shaft 7. A lower space within a rear half of the front housing 1 and a lower space within the transmission casing 2 and rear housing 3 are utilized as an oil sump in which lubricant oil having a level OL shown in FIG. 2 is contained. It is fashioned that the oil level OL is located approximately at the level of the center axis of the intermediate shaft 11 so that the clutch cylinder for the clutches 54F and 54R is rotated without being immersed in the lubricant oil. Boss portions of the gears 49 and 52 include extentions which extend respectively into the clutch cylinder. Each of the fluid-operated clutches 54F and 54R is fashioned into a frictional multi-disc type comprising alternately arranged frictional discs 54a and steel discs 54b which are slidably but non-rotatably supported respectively by each of the extensions and by the clutch cylinder. Each or the steel discs 54b is cone-shaped as shown with respect to clutch 54R. In an engaged condition of clutch, these steel discs 54b are flattened as shown with respect to clutch 54F. As is conventional, each of the clutches 54F and 54R includes a piston 54d which is biased to move toward a direction of disengaging the clutch by a return spring 54c. When a clutch-operating fluid pressure is applied to the piston 54d, discs 54a and 54b are engaged frictionally whereby the clutch is engaged as shown with respect to the clutch 54F. The additional speed change mechanism 12 shown is fashioned as a direction-reversing type in which the output shaft 10 is given a forward directional rotation when the clutch 54F is engaged so as to couple the fourth gear 52, and therefore shaft 10, directly to the primary shaft 7, whereas the output shaft is given a backward directional rotation when the clutch 54R is engaged so as to couple the first gear 49 to the primary shaft 7 and to thereby connect the output shaft 10 to shaft 7 through gears 49, 50, 51, 53 and 52. Alternatively, the additional speed change mechanism may be fashioned as a high/low speed-selector type in which the idler gear 53 shown is omitted and the third and fourth gears 51 and 52 shown are meshed directly with each other.

For supplying operating fluid to the clutches 54F and 54R, clutch-operating fluid passages 55F and 55R are formed in the primary shaft 7, as shown in FIGS. 2 and 3, and are in fluid communication with the clutches. As shown in FIGS. 3, the primary shaft 7 further includes in it a lubricant passage 55L for supplying lubricant oil to the clutch discs 54a and 54b.

As shown in FIGS. 2 and 3, three annular fluid chambers 60F, 60R and 60L are formed between the primary shaft 7 and the hollow cylindrical portion 37 of partition wall 1a by sealing three annular grooves in the outer circumference of shaft 7 by means of the inner circumference of cylindrical portion 37. Clutch-operating fluid passages 55F and 55R in the primary shaft are communicated respectively with the annular fluid chambers 60F and 60R, and lubricant passage 55L in the primary shaft is communicated with the annular chamber 60L. The partition wall 1a includes, in its thickened portion adjacent to the cylindrical portion 37, laterally extending clutch-operating fluid passages 61F and 61R and lubricant passage 61L which open at their one ends respectively at the annular fluid chambers 60F, 60R and 60L.

As shown in FIG. 3, a side wall of the front housing 1 includes, at a location behind the partition wall 1a, an opening 62. A control valve assembly 63 for controlling the operation of the additional speed change mechanism 12 extends through this opening 62 and is fixedly supported by the front housing 1. The valve assembly 63 comprises a valve housing composed of a plate member 64 which is disposed on an outer surface 1c of the side wall set forth above, an outer housing member 66 which is disposed on an outer surface of the plate member 64 with a thin partition plate 180 therebetween, and an inner housing member 67 which is disposed on an inner surface of the plate member 64 and is located within the front housing 1. This valve housing is fixedly secured to the front housing using bolts 68.

Figure 4:
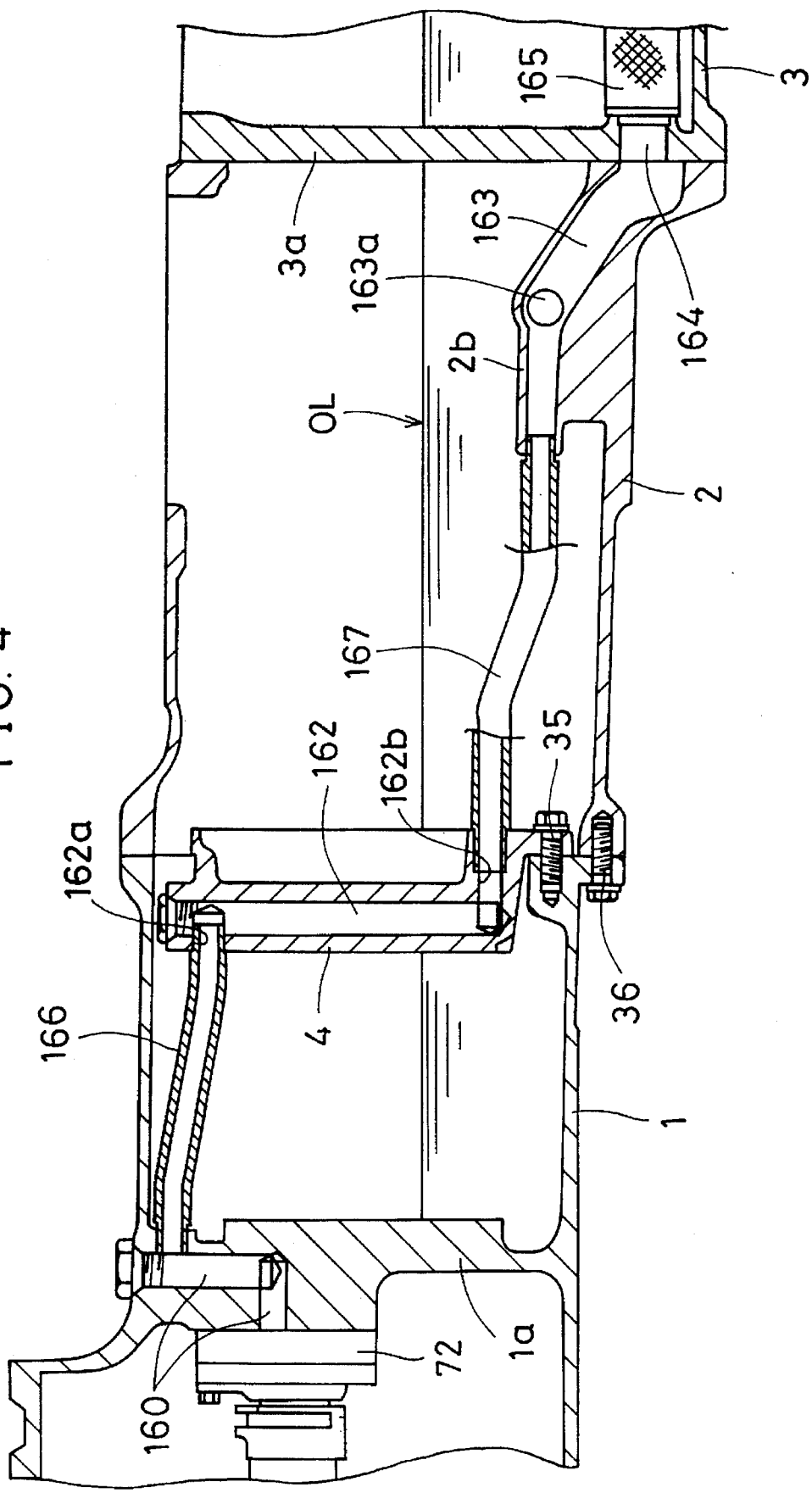
FIG. 4 is a schematic sectional side view, partially omitted, showing a rear half of the front housing, the whole of a transmission casing, and a front end portion of a rear housing shown in FIG. 1.

As shown in FIGS. 2 and 3, fluid pump for supplying clutch-operating fluid to the clutches 54F and 54R is fashioned into an internal gear pump 72 by employing the primary shaft 7 as its pump shaft and is mounted on a front surface of the partition wall 1a. Pump 72 has a suction port 72a and a discharge port 72b. As shown in FIG. 3, the partition wall 1a includes a suction passage 160 which is connected to the pump suction port 72a, and a discharge passage 162 which is connected to the pump discharge port 72b. As shown in FIGS. 3 and 4, the suction passage 161 extends rearwardly from the pump 72 and then upwardly, and opens at a rear surface of the partition wall 1a. As shown in FIG. 3, the discharge passage 161 extends rearwardly from the pump 72 and then laterally, and opens at the outer side surface 1c of front housing 1.

As shown in FIG. 3 and 4, the bearing support frame 4 includes in it a vertical fluid passage 162. As shown in FIG. 4, this fluid passage 162 has a first or upper open end 162a which opens at a front surface of the support frame 4, and a second or lower open end 162b which opens at a rear surface of the support frame 4. Bottom walk of the transmission casing 2 has, at its rear end portion, a thickened wall portion 2b through which a fluid passage 163 extends axially of the casing 2. This passage 163 is communicated, at its rear end and through a bore 164 in the front wall 3a of the rear housing 3, to a filter 165 which is disposed within the oil or fluid sump in the rear housing 3 at a low level such that it extends axially of the rear housing. A first fluid supply pipe 166 is disposed within the front housing 1 and is fitted, at its one and the other ends, in the open end of the suction passage 160 and in the first open end 162a of the fluid passage 162. A second fluid supply pipe 167 is disposed within the transmission casing 2 at a location below the oil level OL and is fitted, at its one and the other ends, in the open front end of the fluid passage 163 and in the second open end 162b or the fluid passage 162. Each of the pipes 166 and 167 has outer diameter-reduced end portions for defining a pair of annular shoulders which are operable to limit an axial displacement of each fluid supply pipe.

As can be appreciated from FIG. 4, the first fluid supply pipe 166 can be installed into the front housing 1 at the same time when the additional speed change mechanism 12 shown in FIG. 2 is assembled into the front housing. The second fluid supply pipe 167 can be installed previously into the transmission casing 2 in the arrangement shown and then can be fixed in position, when the front housing 1 is assembled onto the front of the transmission casing 2, such that the front end of pipe 167 is fittingly inserted into the second open end 162b of fluid passage 162 in the bearing; support frame 4. Although not shown in the drawings, the front wall 3a of the rear housing 3 includes, in its lower portion, an opening through which oil can flow unrestrictedly between the transmission casing 2 and the rear housing 3. The arrangement of filter 165 shown within the rear housing 3 will assure that this filter 165 is necessarily located within the fluid sump below the oil level OL even when the vehicle is climbing up a slope. Fluid or oil is led from the sump within the rear housing 3 to the pump 72 through the filter 165, fluid passage 163, second fluid supply pipe 167, fluid passage 162 in the support frame 4, first fluid supply pipe 166 and fluid suction passage 162 in the partition wall 1a. The thickened wall portion 2b includes a branch passage 163a of the fluid passage 163 for supplying fluid to other fluid-operated mechanisms such as a power steering mechanism by another fluid pump (both not shown).

As shown in FIG. 3, the control valve assembly 63 includes, at a front end portion of the plate member 64, a fluid inlet port 71P which opens at the outer side surface 1c of front housing 1. This inlet port 71P is communicated to the pump discharge passage 161 through an in-line filter 200 which is supported by the plate member 64 and outer housing member 66 and is inserted into the discharge passage. Although not shown in the drawings, the control valve assembly 63 includes various valves for the additional speed change mechanism 12 such as a directional control valve for controlling the operation of the change mechanism 12 and a relief valve for establishing a fluid pressure applied to the fluid-operated clutches 54F and 54R. Plate member 64 further includes two clutch-operating fluid outlet ports and a lubricant outlet port (all not shown) which also open at the surface 1c. These outlet ports are communicated to the annular fluid chambers 60F, 60R and 60L through the passages 61F, 61R and 61L which are formed straight in the partition wall 1a.

The primary speed change mechanism 15 and auxiliary speed change mechanism 18 shown in FIG. 1 will be outlined. The primary change mechanism 15 includes four gears 131, 132, 133 and 134 which are rotatably mounted on the drive shaft 13, and four gears 135, 136, 137 and 138 which are fixedly mounted on the change shaft 14 and are meshed respectively with the gears 131–134 on the drive shaft. Two double-acting synchronizer clutches 139 and 140 are mounted on the drive shaft 13 for selectively coupling gears 131–134 one at a time to the drive shaft. Consequently, this change mechanism 15 is operable to provide first to fourth change ratios.

As also shown in FIG. 1, the change shaft 14 is drivingly connected to the intermediate shaft 16 through a reduction gearing of meshing gears 142 and 143. Two change gears 144 and 145 are fixedly mounted on the intermediate shaft 16, and two shift gears 146 and 147 meshable respectively with gears 144 and 145 are slidably but non-rotatably mounted on the propeller shaft 17. A clutch 148 which can be engaged by displacing shift gear 147 is disposed between the change shaft 14 and propeller shaft 17. Consequently, the auxiliary change mechanism 18 is operable to provide first to third change ratios by the operation of shift gears 146 and 147.

Figure 5:
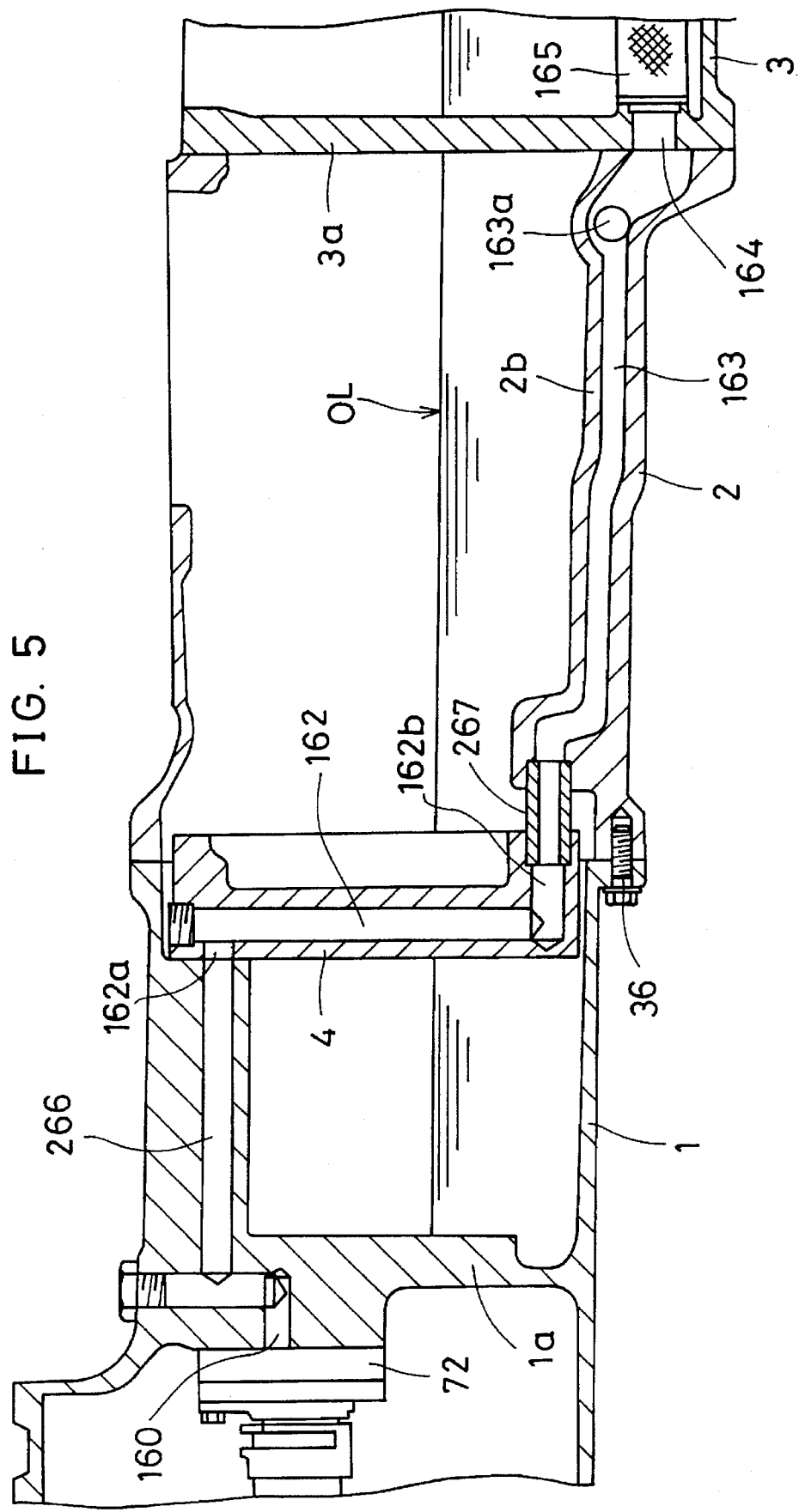
FIG. 5 is a schematic sectional side view similar to FIG. 4 but showing a second embodiment of the present invention.

FIG. 5 depicts a second embodiment. In this embodiment, a first fluid supply passage 266 is formed within a thickened wall portion in the top wall of the front housing 1 such that it directly connects the first open end 162a of fluid passage 162 in the bearing support frame 4 to the pump suction passage 160 in the partition wall 1a. A fluid passage 163 similar to the fluid passage 163 in the first embodiment is formed within a thickened wall portion 2b in the bottom wall of the transmission casing 2 such that its open front end is faced to the second open end 162b of fluid passage 162 in the bearing support frame 4 with a relatively small interval therebetween. A fluid supply pipe 267 or a small length is employed for connecting the second open end 162b to the fluid sump filter 165 through the passage 163.

While preferred embodiments of the invention have been described, it will be appreciated that various modifications and changes may be made without departing from the spirit and scope of the appended claims.

What is claimed is:

1. A transmission assembly for tractors which comprises: a front housing (1) including an internal partition wall (1a) and an open rear end; a transmission casing (2) including an open front end and being fastened to the rear end of said front housing; a fluid-operated first speed change mechanism (12) disposed within said front housing at a location behind said partition wall; a second speed change mechanism (15) disposed within said transmission casing; and a bearing support frame (4) fixedly disposed within a rear end portion of said front housing for supporting said first speed change mechanism at a rear side of the said change mechanism and for supporting said second speed change mechanism at a front side of the said change mechanism, the improvement comprising:

a fluid pump (72) mounted on said partition wall (1a) for supplying fluid to said first speed change mechanism (12);

a fluid passage (162) within said bearing support frame (4), said fluid passage having a first open end (162a) at a front surface of said support frame and a second open end (162b) at a rear surface of said support frame;

a first fluid supply passage means (166; 266) disposed within said front housing (1) for connecting between a fluid suction passage (160) of said fluid pump (72) and said first open end (162a) of said fluid passage (162) within said support frame (4); and a second fluid supply passage means (167; 267) disposed within said transmission casing (2) for connecting between a fluid sump filter (165) and said second open end (162b) of said fluid passage (162) within said support frame (4).

2. The transmission assembly as set forth in claim 1, wherein said bearing support frame (4) is supported by said front housing (1).

3. The transmission assembly as set forth in claim 2, wherein said fluid suction passage (160) opens at a rear surface of said partition wall (1a), and wherein said first and second fluid supply passage means are composed, respectively, of pipe members (166, 167).

4. The transmission assembly as set forth in claim 1, wherein said fluid passage (162) within said support frame (4) extends generally in a vertical direction, said first open end (162a) being located at an upper end of the said fluid passage while said second open end (162b) being located at a lower end of the said fluid passage.

5. The transmission assembly as set forth in claim 1, further comprising a rear housing (3) which is fastened to the rear end of said transmission casing (2), said fluid sump filter (165) being disposed at a low level within said rear housing.

* * * * *

UNITED STATES PATENT AND TRADEMARK OFFICE
CERTIFICATE OF CORRECTION

PATENT NO. : 5,644,954
DATED : July 8, 1997
INVENTOR(S) : Mizuya Matsufuji

It is certified that error appears in the above-indentified patent and that said Letters Patent is hereby corrected as shown below:

```
Column 1, line 46, delete "hall" and substitute therefor -- half --.
Column 2, line 49, delete "hall" and substitute therefor -- half --.
Column 3, line 2,  delete "widen" and substitute therefor -- when --.
Column 4, line 52, delete "lot" and substitute therefor -- for --.
Column 5, line 14, delete "hall" and substitute therefor -- half --.
Column 7, line 17, delete "walk" snd substitute therefor -- wall --.
Column 7, line 32, delete "of" and substitute therefor -- or --.
Column 7, line 53, delete "led" and substitute therefor -- fed --.
Column 8, line 50, delete "or" and substitute therefor -- of --.
```

Signed and Sealed this

Eighteenth Day of November 1997

Attest:

BRUCE LEHMAN

*Attesting Officer*  *Commissioner of Patents and Trademarks*